United States Patent [19]

Stanford et al.

[11] 3,728,420

[45] *Apr. 17, 1973

[54] PHOSPHATED MIXED ESTERS OF OXYALKYLATED POLYOLS AND MONOHYDRIC SURFACE ACTIVE COMPOUNDS

[75] Inventors: James R. Stanford; Paul G. Vogelsang, Jr., both of Houston, Tex.

[73] Assignee: Nalco Chemical Company, Chicago, Ill.

[ * ] Notice: The portion of the term of this patent subsequent to Mar. 24, 1987, has been disclaimed.

[22] Filed: Dec. 9, 1969

[21] Appl. No.: 883,638

Related U.S. Application Data

[62] Division of Ser. No. 584,672, Oct. 6, 1966, Pat. No. 3,502,587.

[52] U.S. Cl. .............260/950, 210/58, 210/59, 252/89, 252/180, 260/929, 260/951, 260/953, 260/978
[51] Int. Cl. ............................C07f 9/08, C02b 1/18
[58] Field of Search......................260/950, 929, 951

[56] References Cited

UNITED STATES PATENTS

| | | | |
|---|---|---|---|
| 3,502,587 | 3/1970 | Stanford et al. | 252/180 |
| 3,429,824 | 2/1969 | Tate | 260/929 X |
| 3,275,667 | 9/1966 | Bohunek et al. | 260/929 X |
| 3,056,744 | 10/1962 | Copes et al. | 260/951 UX |

*Primary Examiner*—Lewis Gotts
*Assistant Examiner*—Anton H. Sutto
*Attorney*—Johnston, Root, O'Keeffe, Keil, Thompson and Shurtleff

[57] ABSTRACT

At least partially water soluble phosphated mixed esters of non-surface active polyols containing at least one hydroxyethyl group and monohydric surface active compounds containing oxyethylene groups are prepared by reacting said polyols and said monohydric compounds with polyphosphoric acid or phosphorus pentoxide at temperatures of 50°C. to 175°C. The products are useful as scale inhibitors in hard waters and are especially useful in squeeze-type operation in oil recovery systems where the chemical must be adsorbed on the underground formation in such a manner that it is slowly released into the water as it passes over the formation.

6 Claims, No Drawings

PHOSPHATED MIXED ESTERS OF OXYALKYLATED POLYOLS AND MONOHYDRIC SURFACE ACTIVE COMPOUNDS

This application is a division of United States application Ser. No. 584,672, filed October 6, 1966 now U.S. Pat. No. 3,502,587.

This invention in general pertains to at least partially water soluble phosphated mixed esters of oxyalkylated polyols and monohydric surface active compounds and to uses thereof as scale inhibitors.

The preferred compositions of the invention are phosphated mixed esters of: (A) either oxyethylated or oxypropylated-terminally oxyethylated polyols, e.g., polyoxyethylated glycerol, ethylene glycol, hexylene glycol, sorbitol, mannitol or trimethylolpropane, or oxyethylated or oxypropylated-terminally oxyethylated erythritol, arabitol, xylitol, quercitol, inositol, and mono-, di-, or tri-pentaerythritol and (B) oxyalkylated monohydroxy surface active compounds, e.g. oxyethylated nonyl phenol, oxyethylated tridecyl alcohol, and oxyethylated normal alcohol mixtures containing six or more carbon atoms.

The oxyalkylated polyols and surface active agents are phosphated by reaction with polyphosphoric acid or phosphorus pentoxide at elevated temperature, preferably in the order of about 50°C. - 175°C. The reaction time is preferably at least about 30 minutes. The reaction may be conducted longer, however, e.g., up to 3-5 hours, to assure complete reaction. If desired, a catalyst such as $BF_3$ etherate complex may be used. When using polyphosphoric acid the oxyalkylated polyol and the oxyalkylated surface active agent can be added to the polyphosphoric acid liquid. Conversely, the polyphosphoric acid can be added to a mixture of said oxyalkylated polyol and surface active agent.

The resultant reaction product may be used as is, or it may be converted to a salt by partial to complete neutralization with an alkaline substance such as, for example, potassium or sodium hydroxide, potassium or sodium carbonate, ammonia, or a basic amino compound, e.g., tetramethyl ammonium hydroxide, methylamine, ethylamine, diethylamine, triethanolamine, diethanolamine, triethyl amine, ethylene diamine, diethylene triamine, pyridine, morpholine or other amine. The amine should preferably be a water soluble amine or at least one that does not destroy solubility in water.

The polyols contain at least one, and preferably an average of at least about two, 2-hydroxyethyl groups ($-CH_2CH_2OH$) provided by the oxyethylation. The primary hydroxyl groups thereof are more effective than the secondary hydroxyl groups which would be provided by oxypropylation

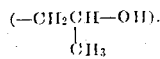

However, oxypropylation may be used if the oxypropylated product is then oxyethylated to provide terminal 2-hydroxyethyl groups.

The compositions of the invention comprise mixed phosphate esters of a phosphated composition derived by the reaction of phosphorus pentoxide or polyphosphoric acid with both: (A) a polyol composition of the formula

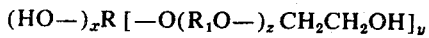

wherein R is a saturated, hydrocarbon radical having two to six carbon atoms, $R_1$ is a member selected from the group consisting of $-CH_2CH_2-$ and

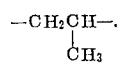

$x$ is a number average in the range of 0-5 inclusive, y is a number average in the range of 1-6, inclusive, preferably 3-5, and the sum of $x$ plus $y$ equals 2-6, and z is a number average in the range of 0-30, inclusive, and (B) a monohydric oxyalkylated surface active agent having a terminal 2-hydroxyethyl group, said phosphated compositions having an average of at least one and up to all of the hydroxyls of the 2-hydroxyethyl groups and on an average of zero up to substantially all of said hydroxyl groups directly attached to the radical R replaced by phosphate ester groups derived from said phosphorus pentoxide, or polyphosphoric acid, said phosphate ester groups consisting essentially of one or both of a member selected from the group consisting of

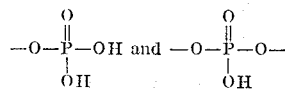

Also, the invention embraces the salts derived by the partial to complete neutralization of the phosphate ester groups.

Preferred embodiments include those in which said polyol is derived by oxyethylation of glycerol with 1.5 to 2.5 mols of ethylene oxide per mol of glycerol; those in which said polyol is derived by the oxyethylation of mannitol with about 2-20 mols of ethylene oxide per mol of mannitol; those in which said polyols are derived by the oxyethylation of sorbitol with about 2-20 mols of ethylene oxide per mol of sorbitol; those in which said polyol is derived by the oxyethylation of trimethylolpropane with 1.5 to 2.5 mols of ethylene oxide per mol of trimethylolpropane; those in which said monohydric surface active agent is derived by the oxyethylation of alkyl phenols, e.g., containing four to 12 carbon atoms in the alkyl group or groups, preferably nonyl phenol or dinonyl phenol or mixtures thereof, or primary alcohols containing six to 18 carbon atoms, preferably tridecyl alcohol, or mixed six to 10 carbon atoms alcohols, with 2-20, preferably 4-14 moles of ethylene oxide per mole of such monohydric substance.

The invention further embraces a process for preventing hardness scale deposits on metal surfaces in contact with hard water containing hardness scale-forming ions which comprises contacting said metal surfaces with said hard water while maintaining therein a hardness-ion-precipitation-preventing quantity in the order of 0.5-100 parts per million of the previously described mixed esters and salts thereof.

The invention is particularly suitable for scale prevention by natural brines on ferrous metal walls and other surfaces in oil producing and water flood systems. Inorganic polyphosphates have long been the most effective and economical sequestering agents used for the prevention of alkaline deposits in both oil producing and water flood systems. However, due to the problems encountered in feeding inorganic polyphosphates and their incompatibility with many waters, a need for a liquid organic phosphate with good solubility in waters containing hardness ions has become increasingly evident. For this reason, a liquid product with good solubility in produced waters and having the effectiveness and low treating cost of inorganic polyphosphates is needed.

The invention has utility in the prevention of similar scale deposits occurring in closed and once-through cooling systems where hard water is employed.

The compounds may also have utility in boiler feed waters and in waters charged to certain desalinization equipment where scale deposition is a problem.

The invention may also be used in the prevention of scale deposits in certain effluent and disposal waters, particularly where other materials used in the prevention of such deposits may constitute a pollution problem.

The following are examples of preferred embodiments of the invention wherein the parts are by weight unless otherwise indicated.

EXAMPLE I

Glycerine and finely ground potassium hydroxide are charged into an oxyalkylation reactor and are heated to 150°C. while purging the reactor with natural gas. Ethylene oxide is added slowly at 150°–160°C. until the weight amount of added ethylene oxide equals the weight of the glycerine. The reactor contents are recycled for an additional hour after all the ethylene oxide is added to assure essentially complete oxyalkylation. The weight of the added KOH was about 0.1 percent of the total weight of glycerine and ethylene oxide.

The phosphating procedure comprises charging 100 parts of the above polyoxyethylated glycerine, 50 parts oxyethylated nonyl phenol (56.6 percent nonyl phenol and 44.4 percent ethylene oxide) and 30 parts of 99 percent isopropanol, the latter as a viscosity control agent, into a vessel free from moisture and oily or other foreign material. The charge is heated to 50°C., whereupon 200 parts of polyphosphoric acid (also called 115 percent phosphoric acid) is added in small amounts whereby the exothermic reaction is controlled by the rate of addition and by cooling to maintain a temperature of 80°–90°C. When the polyphosphoric acid has been added, the temperature is allowed to increase to the range of 90°–95°C. for about 30 minutes, or less if the clarity of the reaction mass indicates complete reaction.

With the reactor on full cooling, 350 parts of tap water is added, slowly in the initial phase of water addition.

The product is an aqueous solution of mixed esters and mixtures of esters containing some monophosphate and some di-phosphate. Some of the esters are monomeric and some polymeric. Of course, some phosphated oxyalkylated monohydric surface active agent can be present as well as some phosphated oxyalkylated polyol. While the phosphated surface active agent alone will have some scale inhibitor properties, the phosphated oxyalkylated polyol is more effective, and the combination of the two, especially when the oxyalkylated polyol and monohydric surface active agent are phosphated together, is better than either component alone.

In the foregoing Example, the phosphation was done with polyphosphoric acid, but it can be done with phosphorus pentoxide. However, the reaction is smoother with polyphosphoric acid and is much easier to control.

Examples of further oxyethylated polyhydric compounds which can be obtained by the oxyalkylation procedure of Example I and can be phosphated as therein described are as follows:

TABLE 1

Oxyalkylated Compounds

A

| Example | Polyhydric Compound Name | % | Ethylene Oxide % |
|---|---|---|---|
| $A_1$ | Glycerine (Ex. 1) | 50.0 | 50.0 |
| $A_2$ | " | 25.8 | 74.2 |
| $A_3$ | " | 7.7 | 92.3 |
| $A_4$ | Glycerine | 25.0 | |
| | Pentaerythritol | 25.0 | 50.0 |
| $A_5$ | Glycerine | 49.3 | 50.7 |
| $A_6$ | " | 35.0 | 65.0 |
| $A_7$ | " | 84. | 16.0 |
| $A_8$* | Trimethylolpropane | 58.7 | 41.3 |
| $A_9$ | Sorbitol | 31.2 | 68.8 |
| $A_{10}$ | " | 18.6 | 81.4 |
| $A_{11}$** | Mannitol | 70.5 | 29.5 |
| $A_{12}$ | " | 50.0 | 50.0 |

* Catalyst-BF$_3$ etherate complex
** Solvent - dioxane

B

| Example | Surface Active Agent Name | % | Ethylene Oxide % |
|---|---|---|---|
| $B_1$ | Nonyl phenol | 56.6 | 44.4 |
| $B_2$ | Nonyl phenol | 40.0 | 60. |
| $B_3$ | Nonyl phenol | 32.5 | 67.5 |
| $B_4$ | Nonyl phenol | 28.9 | 71.1 |
| $B_5$ | Tridecyl alcohol | 30.7 | 69.3 |
| $B_6$ | Tridecyl alcohol | 47.5 | 52.5 |
| $B_7$ | Higher alcohols (butanol bottoms) | 53.3 | 46.7 |
| $B_8$*** | 6-10 Carbon normal alcohols (Alfol 610) | 41.2 | 58.7 |

*** plus 0.1% caustic potash

| Example | Parts oxy-alkylated compounds | Parts polyphos-phoric | Parts organic solvent | Time, temp., Hr. | °C. | After treatment, parts H$_2$O | Caustic | Alkanol |
|---|---|---|---|---|---|---|---|---|
| 2 | 100A$_2$; 100B$_1$; 4 ml. BF$_3$ | 125 | 0 | 1 | 100–110 | 405 | 63 | 0 |
| 3 | 100A$_1$; 100B$_2$ | 200 | *50 | 0.5 | 90–95 | 400 | 0 | 0 |
| 4 | 100A$_1$; 50B$_2$ | 200 | *30 | 0.5 | 90–95 | 350 | 0 | 0 |
| 5 | 100A$_1$; 50B$_4$ | 200 | *30 | 0.5 | 90–95 | 350 | 0 | 0 |
| 6 | 100A$_1$; 50B$_2$ | 300 | *30 | 0.5 | 90–95 | 450 | 0 | 0 |
| 7 | 100A$_1$; 50B$_3$ | 300 | *30 | 0.5 | 90–95 | 450 | 0 | 0 |
| 8 | 100A$_1$; 30B$_3$; 20B$_1$ | 300 | *30 | 0.5 | 90–95 | 450 | 0 | 0 |
| 9 | 100A$_1$; 30B$_3$ | 200 | *20 | 0.5 | 90–95 | 330 | 0 | 0 |
| 10 | 100A$_1$; 20B$_3$ | 200 | *20 | 0.5 | 90–95 | 320 | 0 | 0 |
| 11 | 100A$_1$; 10B$_1$ | 200 | *10 | 0.5 | 90–95 | 310 | 0 | 0 |
| 12 | 100A$_1$; 50B$_3$ | 200 | *30 | 0.5 | 90–95 | 40 | **15 | 0 |
| 13 | 50A$_1$; 100B$_4$ | 125 | 0 | 0.5 | 90–95 | 275 | 0 | 0 |
| 14 | 50A$_1$; 100B$_4$ | 50 | 0 | 0.5 | 90–95 | 200 | 0 | 0 |
| 15 | 20A$_2$; 100B$_4$ | 100 | *20 | 0.5 | 90–95 | 220 | 0 | 0 |

| Example | Parts oxy-alkylated compounds | Parts polyphos-phoric | Parts organic solvent | Time, temp., Hr. | Time, temp., °C. | After treatment, parts H₂O | After treatment, parts Caustic | After treatment, parts Alkanol |
|---|---|---|---|---|---|---|---|---|
| 16 | 100A₁; 40B₃ | 200 | *30 | 0.5 | 90–95 | 340 | 0 | 0 |
| 17 | 100A₁; 100B₃ | 400 | *30 | 0.5 | 90–95 | 340 | 0 | 0 |
| 18 | 100A₁; 100B₃ | 400 | *30 | 0.5 | 90–95 | 600 | 0 | *125 |
| 19 | 100A₃; 50B₃ | 200 | *30 | 0.5 | 90–95 | 350 | 0 | 0 |
| 20 | 100A₁; 50B₃ | 200 | *30, ***30 | 0.5 | 90–95 | 350 | 0 | 0 |
| 21 | 100A₄; 50B₃ | 200 | *30 | 0.5 | 90–95 | 350 | 0 | 0 |
| 22 | 75A₁; 75B₃ | 200 | *0 | 0.5 | 90–95 | 350 | 0 | 0 |
| 23 | 75A₁; 75B₅ | 200 | *30 | 0.5 | 90–95 | 350 | 0 | 0 |
| 24 | 100A₁; 50B₃ | 150 | ****50 | 0.5 | 90–95 | 350 | 0 | 0 |
| 25 | 100G; 50B₃ | 200 | 0 | 0.5 | 90–95 | 350 | 0 | 0 |
| 26 | 100A₁; 75B₃ | 200 | *30 | 0.5 | 90–95 | 375 | 0 | 0 |
| 27 | 100A₁; 100B₃ | 200 | *30 | 0.5 | 90–95 | 400 | 0 | 0 |
| 28 | 75A₁; 85B₃ | 200 | *30 | 0.5 | 90–95 | 350 | 0 | 0 |
| 29 | 75A₁; 100B₃ | 200 | *30 | 0.5 | 90–95 | 375 | 0 | 0 |
| 30 | 50A₁; 100B₃ | 200 | *30 | 0.5 | 90–95 | 350 | 0 | 0 |
| 31 | 25A₁; 100B₃ | 200 | *30 | 0.5 | 90–95 | 325 | 0 | 0 |
| 32 | 100A₃; 100B₄ | 150 | 0 | 0.5 | 90–95 | 200 | 0 | 0 |
| 33 | 100A₃; 100B₃ | 150 | 0 | 0.5 | 90–95 | 200 | 0 | 0 |
| 34 | 100A₃; 100B₃ | 250 | *30 | 0.5 | 90–95 | 450 | 0 | 0 |
| 35 | 60A₁; 215B₆ | 170 | 0 | 0.5 | 100 | 395 | 0 | 0 |
| 36 | 60A₁; 215B₆ | 255 | 0 | 0.5 | 100 | 480 | 0 | ¹50 |
| 37 | 60A₁; 215B₆ | 340 | 0 | 0.5 | 160 | 565 | 0 | ¹50 |
| 38 | 30A₁; 215B₆ | 170 | 0 | 0.5 | 160 | 365 | 0 | ¹50 |
| 39 | 30A₁; 215B₆ | 255 | 0 | 0.5 | 100 | 450 | 0 | ¹50 |
| 40 | 30A₁; 215B₆ | 340 | 0 | 0.5 | 100 | 535 | 0 | ¹50 |
| 41 | 120A₁; 215B₆ | 170 | 0 | 0.5 | 100 | 455 | 0 | ¹50 |
| 42 | 120A₁; 215B₆ | 255 | 0 | 0.5 | 100 | 540 | 0 | ¹50 |
| 43 | 120A₁; 216B₆ | 340 | 0 | 0.5 | 100 | 625 | 0 | ¹50 |
| 44 | 120A₁; 215B₆ | 425 | 0 | 0.5 | 100 | 710 | 0 | ¹50 |
| 45 | 60A₁; 215B₆ | 340 | 0 | 0.5 | 100 | 565 | 0 | ¹50 |
| 46 | 30A₁; 215B₆ | 170 | 0 | 0.5 | 100 | 365 | 0 | ¹50 |
| 47 | 90A₁; 320B₅ | 340 | 0 | 0.5–1 | 100 | 700 | 0 | ¹50 |
| 48 | 45A₁; 160B₅ | 340 | 0 | 0.5–1 | 100 | 495 | 0 | ¹50 |
| 49 | 120A₁; 215B₆ | 425 | 0 | 1 | 90 | 1,060 | 0 | ²50 |

¹=n-propanol.
²=methanol.
*99% isopropanol.
**Liquid 50% NaOH in water.
***99% acetic acid.
****hydroxy acetic acid.
G=ethylene glycol.

EXAMPLE 50

This Example illustrates carrying out the process by adding the oxyalkylated polyol and oxyalkylatd surface active agent to warm liquid polyphosphoric acid.

425 parts of polyphosphoric acid was placed in a three neck reaction flask provided with agitation and heating means. THe temperature was raised to 70°C. and a mixture of the following, heated to 50°C., was slowly added:

215 parts $B_6$
120 parts $A_1$

The addition rate was regulated so that the temperature of the reaction mass increased to 130°C. When the addition was finished, the reaction mass was held at 130°C. for 30 minutes. It was then cooled to 85°C., 50 parts of n-propanol was added, followed by cooling to 60°C., the addition of 50 parts methanol, agitation for 10 minutes and the addition of 1060 parts water.

EXAMPLE 51

In a reaction vessel equipped with a stirrer, 100 parts of the oxyalkylated glycerine $A_1$, 200 parts of oxyethylated high boiling alcohols and 90 parts of $P_2O_5$ are heated and reacted at 185°–190°C. The reaction mixture is refluxed for 15 minutes. After cooling, the reaction production is diluted with 390 parts of water and is neutralized with caustic soda flakes.

The specific mixture in this example was a heavy alcohol mixture called "butanol bottoms" and comprised n-butanol, 3 percent; $C_5$ alcohols, 0.5 percent; $C_6$ alcohols, 10 percent; $C_7$ alcohols, 23 percent; $C_8$ alcohols, 45 percent; and $C_9$–$C_{12}$ alcohols, 14 percent. The alcohols were mostly primary, branch chain alkanols. They were oxyethylated at 120°–160°C. with 345 parts by weight of ethylene oxide per 130 parts of the heavy alcohol mixture with 0.1 percent by weight of finely ground potassium hydroxide as the alkaline catalyst. The ethylene oxide addition took about one hour at 120°–160°C. and was followed by a one hour recycle period of 160°C.

Example 51 illustrates the use of $P_2O_5$ as the phosphating agent.

Lower alkanols, particularly n-propanol or isopropanol, may be present in the phosphating reaction as viscosity control agents. Other solvents can be used, e.g., dioxane and toluene. Lower alkanol phosphates which form by the reaction of the alkanol and the phosphating agent are not particularly active as scale inhibitors.

On the other hand, phosphated esters and/or salts thereof of oxyethylated higher alkanols having at least 4 carbons, preferably six to 20 carbon atoms, are used in the invention is admixture with, or as mixed esters with, the phosphated esters of oxyalkylated polyols. The oxyethylated alkanols contain about 2–20 mols of oxyethylene groups per mol of alkanol and have the general formula $$RO-(CH_2CH_2O)_{2-20}H$$

wherein R is a straight chain or branch chain alkyl group of at least 4 and preferably at least six carbons. Mixture of two or more alkanols are also contemplated by the invention. Other higher molecular weight oxyalkylated surface active substances containing primary hydroxyl groups which can be phosphated wtih polyphosphoric acid or $P_2O_5$, e.g., the oxyethylated alkyl phenols, provide compositions in the form of mixed phosphate esters or mixtures of esters which are very useful.

In preparing these compositions, the weight ratio of oxyalkylated polyol to oxyalkylated monohydric surfactant containing a 2-hydroxyethyl group is preferably within the range of 1:10 to 10:1.

The compositions of the invention are especially effective in the inhibition of scaling on metal surfaces by calcium sulfate, barium sulfate, and calcium carbonate. They are useful in the oil production industry to prevent deposits of these scale-producing compounds on metal surfaces of pumps, pipes, valves, tanks, and the like when waters containing the scale-producing compounds (or precursors thereof, e.g., calcium bicarbonate) are treated in the concentrations aforesaid, i.e., 0.5 to 100 parts per million. Places where scale build up is most likely to become troublesome are those in the liquid handling systems wherein there is a change in fluid pressure, a change in fluid temperature, or a change in fluid flow rate.

The invention may be used in waterflood systems used to inject water into subterranean formations, wherein the water is brackish or is a brine conducive to scale formation on metal surfaces of the waterflood system. Typical brines encountered in waterflood operations, wherein water is drawn from sources available at or near the waterflood site, are:

|  | Brine A | Brine B |
| --- | --- | --- |
| Chloride (NaCl) | 49,000 mg/l. | 28,000 mg/l. |
| Total Hardness (CaCO$_3$) | 5,300 mg/l. | 3,400 mg/l. |
| Calcium (CaCO$_3$) | 4,900 mg/l. | 1,600 mg/l. |
| Alkalinity P(CaCO$_3$) | 120 mg/l. | 80 mg/l. |
| Alkalinity M(CaCO$_3$) | 1,050 mg/l. | 130 mg/l. |
| Sulfate (NaSO$_4$) | 0 | 4,750 mg/l. |
| pH | 7.8 | 8.3 |

Any of the products previously described can be used to prevent scale formation on metal walls of pipes, pumping equipment and storage tanks used to inject flood waters into subterranean formations. The dosage will vary depending on the particular composition and the type of brine in the formation but, in general, effective control is obtained with 10 to 20 parts per million (ppm) of inhibitor and in some cases as low as 0.5 ppm is effective. Thus, the inhibitor of Example 49 is effective in inhibiting scale by brines A and B at 10–20 ppm.

In cooling waters of closed cooling systems, wherein the cooling water is a typical municipal tap water, maintenance of dosage levels of 15–30 ppm. are typical, although higher levels up to about 100 ppm. may be needed or desired in particular cases.

In low pressure boilers, dosage levels in the range of 50–250 ppm. may be employed in the feed water, a typical level being about 80–100 ppm.

The compositions of the invention are useful in a number of areas where scaling of metal surfaces, particularly ferrous metal surfaces, by barium sulfate, calcium sulfate and/or calcium carbonate is a problem. By control of scale formation, breakdowns, maintenance, cleaning and repairs caused or necessitated by scale formations can be minimized.

In comparative tests using brines made by dissolving 7.5 grams of sodium chloride and 8.33 grams of calcium chloride in distilled water sufficient to make 1 liter (Brine C) and 7.5 grams sodium chloride plus 10.66 grams Na$_2$SO$_4$ in distilled water sufficient to make 1 liter (Brine D), it was found that the composition of Example 1 was partially effective in preventing calcium sulfate deposition at 1 ppm. and completely effective at 2 ppm. when 50 ml. of each brine were mixed and heated for 20 hrs., at 160°F. A control test with no additive gave a deposit of 1350 ppm. CaSO$_4$, calculated as CaCO$_3$. The composition of Example 44 gave no deposits at 1 ppm. added to 100 ml. of the brines C and D. At the same dosage a phosphated oxyethylated glycerine without the oxyethylated tridecyl alcohol component gave a deposit of 400 ppm. CaSO$_4$, calculated as CaCO$_3$, thereby indicating that the mixed ester is more effective than the phosphated oxyethylated polyol alone.

Calcium carbonate deposition tests also indicated a superiority for the compositions of the invention. Thus, the compositions of Examples 44, 47 and 48 prevented calcium carbonate deposition on the surface of test cells containing 20 ml. of brine (Brine E) made by dissolving 8.4 grams of NaHCO$_3$ in one liter of distilled water, 90 ml. of brine (Brine F) made by dissolving 11.1 grams of CaCl$_2$ in 1 liter of distilled water and 90 ml. of brine (Brine G) which was a 10 percent solution of sodium chloride in water, mixed together and heated for 20 hours at 160°F. Complete inhibition of calcium carbonate deposition was obtained with all three compositions at dosages of 5 ppm., 10 ppm. and 30 ppm. and with Example 44 at 3 ppm. The blank control deposited 380 ppm. A phosphated polyol was completely effective at a dosage of 10 ppm. and 30 ppm. but only partially effective at 3 ppm. and 5 ppm.

The process of the invention can be carried out with relative ease and is especially important where the polyols have closely spaced hydroxyls such as glycerine and pentaerythritol. The addition of 2-hydroxyethyl groups spaces the hydroxyl groups and makes it easier to produce phosphate esters without forming a viscous mass. The final products are preferably acidic, e.g., pH 4.5–6, because water solubility decreases and solids precipitate at pH's above 7.

In the process for making phosphate esters previously described it will be understood that where a solvent is used the process is carried out at a temperature below the boiling point of the solvent.

The solvents used act as combination solvents and viscosity control agents, although any solvents, e.g., hydroxyacetic acid, having a reactive hydroxyl group will react in the phosphation and influence the overall composition of the final product.

It will also be understood that other surface active agents can be used provided they contain a 2-hydroxyethyl group. Numerous examples are given in McCutcheon's "Detergents and Emulsifiers" 1966 Annual.

In a number of oil fields in West Texas and other areas, water floods have been established in which waters incompatible with the connate waters were used for injection. This occurs when a good source of compatible water is not available. Most of these floods are using a high sulfate water to flood a formation which has a high calcium content water. As the waters reach the producing well they mix, and a calcium sulfate deposition occurs, either in the formation at the well bore or in the producing equipment. This requires the removal of the tubing, rods and pump for cleaning, and a fracturing job if the formation is plugged, which is the case most of the time. By the practice of the present invention the formation of scale in the producing equipment and underground formation can be reduced or prevented. However, as the scale forms in the producing formation, the scale control chemical must be squeezed into the producing underground formation so it can be produced back slowly in one of the waters before they mix. To give long term scale inhibition the chemical must be adsorbed on the underground formation in such a manner that it is slowly released into the water as it passes over the formation so that a chemical concentration of one to 10,000 ppm. is always in the water. Some scale control compounds when squeezed into the formation are so tightly adsorbed that little, if any, feedback occurs, while others are essentially not adsorbed and feedback occurs immediately with no extended protection given. The chemicals of the present invention have unique adsorption-desorption properties in that they are adsorbed on solid surfaces and slowly released into the produced water or brine over a period of time to give long term protection against scale deposition in the surfaces of the formation face and the producing equipment.

In a typical application, five to ten barrels of water from a producing oil well are pumped into an oil well. A chemical composition as herein described is then injected into the well and displaced or "squeezed" through the underground oil-bearing formation by pumping 50 to 150 barrels of produced water into the well, depending upon the amount of water being produced. The produced oil and water are then pumped from the well.

Similarly, the invention is applicable to the treatment of water supply wells. The pre-addition of water to the well can be omitted. The phosphate mixed esters or mixture of esters can also be added directly to the input well of a waterflood system consisting of one or more input wells and one or more producing wells.

The invention is hereby claimed as follows:

1. A phosphate mixed ester of: (A) a polyol of the formula $$(HO-)_x R [-O(R_1 O-)_z CH_2CH_2OH]_y$$

wherein R is a saturated, hydrocarbon radical having two to six carbon atoms, $R_1$ is a member selected from the group consisting of

$x$ is a number average in the range of 0–5, inclusive, $y$ is a number average in the range of 1–6, inclusive, and the sum of $x$ plus $y$ equals 2–6, and $z$ is a number average in the range of 0–30, inclusive, and (B) a monohydric oxyalkylated surface active agent having a 2-hydroxyethyl group, said monohydric surface active agent being from the group consisting of (a) oxyethylated alkyl phenols and mixtures thereof containing 4 to 12 carbon atoms in an alkyl group oxyethylated with 2 to 20 moles of ethylene oxide per mole of said alkyl phenol and (b) oxyethylated alkanols and mixtures thereof having the general formula $$RO-(CH_2CH_2O)_{2-20}H$$

wherein R is a straight chain or branch chain alkyl group having at least four carbon atoms, said phosphate mixed ester having an average of at least one and up to all of the hydroxyls of the 2-hydroxy ethyl groups and on an average of zero up to substantially of said hydroxyl groups directly attached to the radical R replaced by phosphate ester groups, said phosphate ester groups consisting essentially of one or both of a member selected from the group consisting of

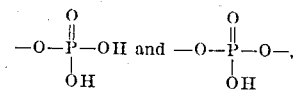

the weight ratio of (A) to (B) being within the range of 1:10 to 10:1.

2. A water soluble salt derived by the partial to complete neutralization of said phosphate ester groups of a composition as claimed in claim 1.

3. A phosphate mixed ester as claimed in claim 1 wherein said polyol is derived by oxyethylation of glycerol with 1.5 to 2.5 mols of ethylene oxide per mol of glycerol.

4. A phosphate mixed ester as claimed in claim 1 wherein said surface active agent is an oxyethylated alkyl phenol containing 4–12 carbon atoms in an alkyl group oxyethylated with about 2–20 mols of ethylene oxide per mol of said alkyl phenol.

5. A phosphate mixed ester as claimed in claim 1 wherein said surface active agent is derived by oxyethylation of tridecyl alcohol with about 2–20 mols of ethylene oxide per mol of tridecyl alcohol.

6. A phosphate mixed ester as claimed in claim 1 wherein said surface active agent is an oxyethylated mixture of six to 10 carbon atom primary alcohols.

* * * * *